United States Patent
Yamamoto

[11] Patent Number: 6,101,248
[45] Date of Patent: Aug. 8, 2000

[54] FALSE CALL PROTECTING APPARATUS FOR USE WITH TELEPHONE EXCHANGE SYSTEM AND FALSE CALL PROTECTING METHOD

[75] Inventor: Takaaki Yamamoto, Tokyo, Japan

[73] Assignee: NEC Corporation, Tokyo, Japan

[21] Appl. No.: 08/916,996

[22] Filed: Aug. 20, 1997

[30] Foreign Application Priority Data

Aug. 27, 1996 [JP] Japan .................................. 8-224906

[51] Int. Cl.⁷ .................................. H04M 17/00
[52] U.S. Cl. .................. 379/144; 379/111; 379/121; 379/145
[58] Field of Search .................... 379/145, 165, 379/34, 196, 197, 198, 111, 114, 115, 121, 133, 134, 143

[56] References Cited

U.S. PATENT DOCUMENTS 5,495,521  2/1996  Rangachar ................ 379/95

OTHER PUBLICATIONS

Recommendation Q.141—Line Signalling—Fascicle VI.2—Rec. Q.141.

*Primary Examiner*—Curtis A. Kuntz
*Assistant Examiner*—Binh K. Tieu
*Attorney, Agent, or Firm*—Laff, Whitesel & Saret, Ltd.; J. Warren Whitesel

[57] ABSTRACT

When a false signal received from a telephone set on a false originating side is detected, a call thereof is immediately disconnected. In reality, the system comprises a detecting portion 5A and a signal unit 4. The detecting portion 5A detects a false signal according to international telecommunication standard ITU-T No. 5 signal system. The signal unit 4 disconnects the call when the detecting portion 5A detects a false signal. The system further comprises a supervising means that supervises a false signal using toll-free service with a credit card system. A supervising unit 5 supervises whether or not a false signal is present. Corresponding to the supervised result of the supervising means, when a false signal is detected, the signal unit 4 immediately disconnects the call. Thus, the performance of the telephone exchange system is improved. In addition, the security of the system is improved.

12 Claims, 4 Drawing Sheets

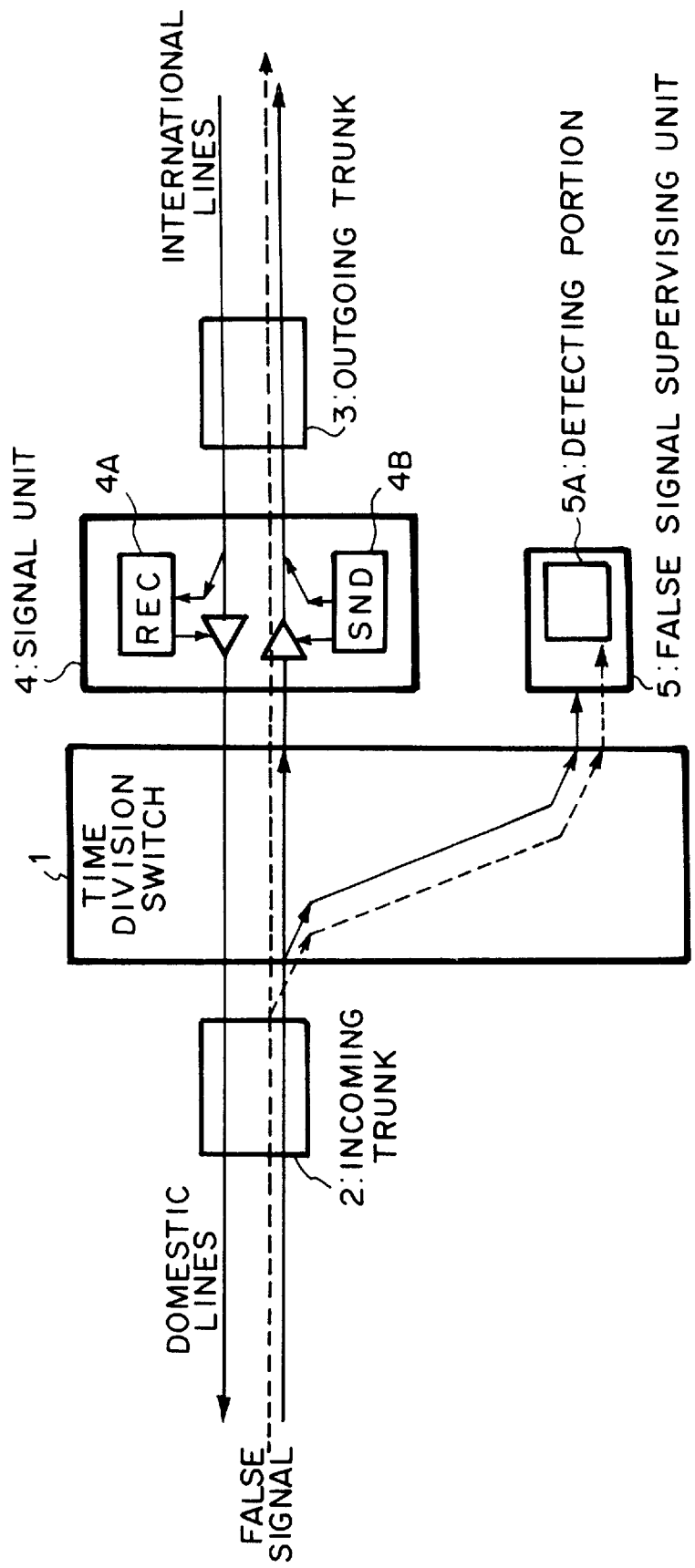

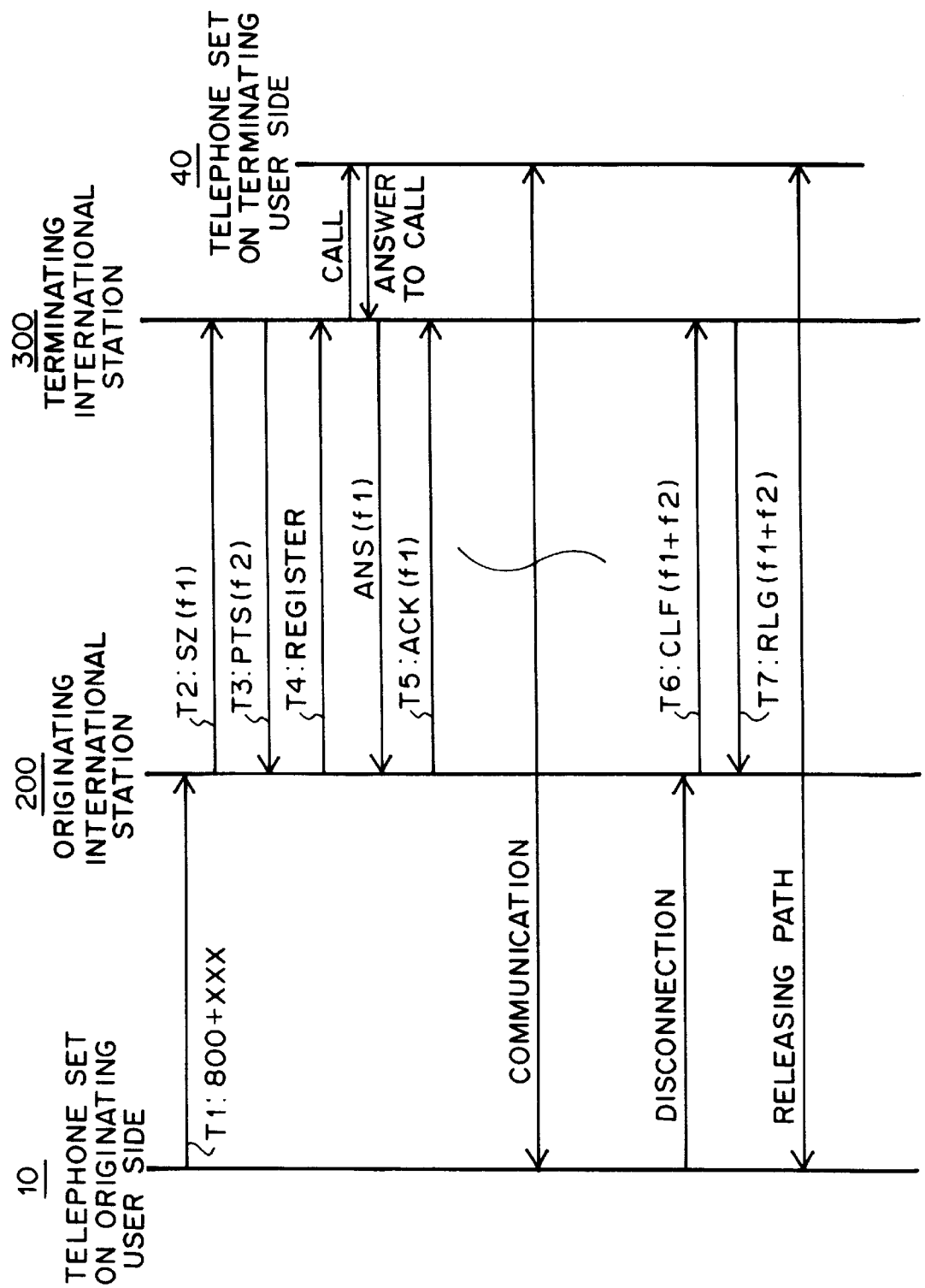

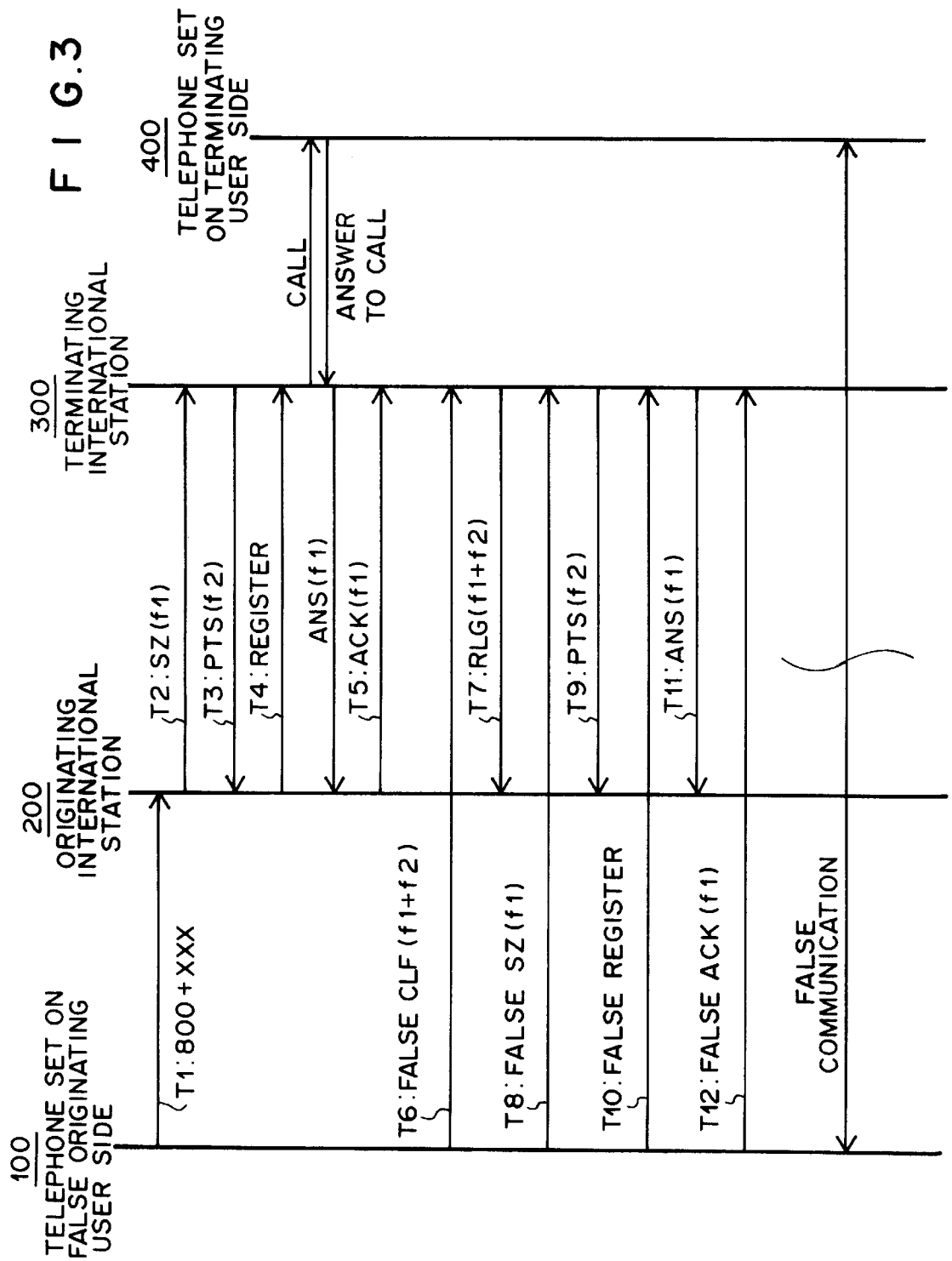

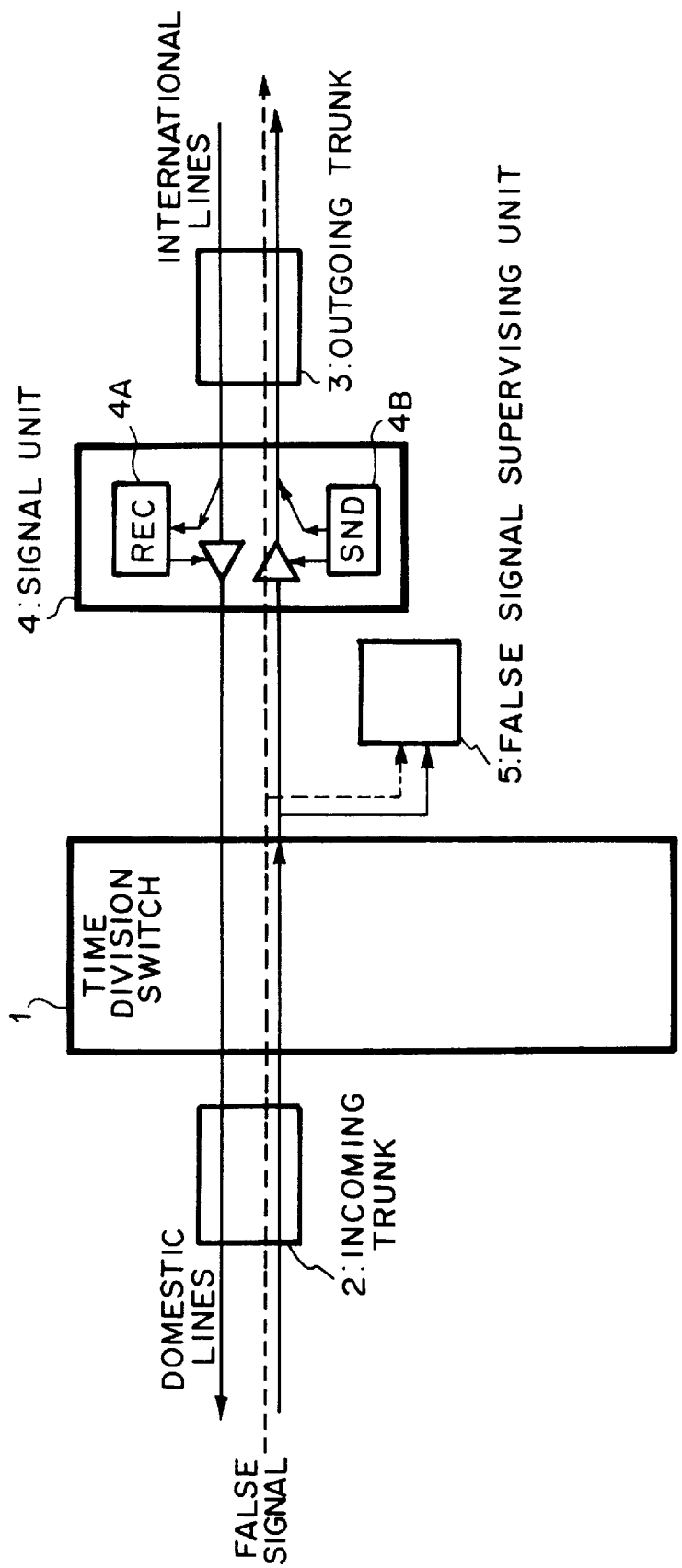

FALSE CALL PROTECTING APPARATUS FOR USE WITH TELEPHONE EXCHANGE SYSTEM AND FALSE CALL PROTECTING METHOD

BACKGROUND OF THE INVENTION

1. Field of the Invention

The present invention relates to a false call protecting apparatus for use with a telephone exchange system and a false call protecting method, in particular, to a false call protecting apparatus for use with a telephone exchange system that has an exchange that causes an international call to be charged on the terminating side and a false call protecting method thereof.

2. Description of the Related Art

Conventionally, a credit card call service has been widely used. In the credit card call service, when the user dials a toll-free number with his or her credit card number to make an international call, the international call is charged on the terminating exchange side. Against such a service, a false call with a deception of a charging system of the toll-free service has thrived.

Conventionally, to protect such a false call, an illegal signal is detected from a signal sequence and the call thereof is disconnected. However, due to a delicate difference between line signal receiving characteristics of exchanges, the illegal signal cannot be sometimes recognized. Thus, a false call cannot be completely protected and thereby it has thrived.

In conventional telephone exchange systems that have a line signal receiving function according to International Telecommunication Union Telecommunication Standard ITU-T recommendations, it is difficult to completely detect an illegal signal. This invention is especially directed to Q140–Q164 of the ITU-T No. 5 standards issued November 1988 and March 1993 and dealing with a credit card and especially to Q140–Q144, Q146, Q151, Q152, Q153 and Q154. These sections will be identified in whole or in part in the appended claims by the phrase "at least one version of . . . ITU-T No. 5 Signal System".

As countermeasures against a false call on a terminating international station side, after it receives a CLF signal from an originating station side, the transmission time of a release guard (RLG) as an answer signal thereof may be increased, However, unless all terminating international stations take such countermeasures, false calls cannot be completely protected Thus, such countermeasures should be taken on the originating international station side.

Consequently, originating international stations of such a telephone exchange system do not have a means for detecting a false signal received from a telephone set of a false originating side. Thus, since the telephone set on the false originating side sends an false signal to an terminating international station, the security cannot be maintained.

SUMMARY OF THE INVENTION

The present invention is made from the above-described point of view.

An object of the present invention is to provide a false call protecting apparatus for use with a telephone exchange system that t protects a false international call and a false call protecting method thereof.

Another object of the present invention is to protect a false call so as to improve the performance of a telephone exchange system, thereby improving the a security of the system.

In a false call protecting apparatus for use with a telephone exchange system and a false call protecting method according to the present invention, when a false signal received from a telephone set on a false originating side is detected, the call is immediately disconnected. In more reality, the false call protecting apparatus according to the present invention comprises a detecting means for detecting a false signal according to international telecommunication standard ITU-T No. S.

In addition, the present invention is a communication exchange system that allows a call to be made with a toll-free service, comprising an originating side telephone for originating a call with a toll-free service, an originating side exchange for receiving the call with the toll-free service, a terminating side exchange station for sending and receiving a supervise signal corresponding to a compelled procedure with the originating side exchange station and for performing a charging process, a terminating side telephone, connected to the terminating side exchange station, for communicating with the originating side telephone, and a supervising unit, disposed between the originating side exchange station and the terminating side exchange station, for supervising and detecting a false signal received from the originating side telephone, wherein the originating side exchange station disconnects a communication path between the originating side exchange side and the terminating side exchange station when the supervising unit detects the false signal.

In an originating international station, the supervising means supervises whether or not a false signal has been received from a telephone set on the originating side. When a false signal has been detected by the supervising means, the disconnecting means immediately disconnects the call. Thus, the performance of the telephone exchange system is improved. In addition, the security of the system can be improved.

These and other objects, features and advantages of the present invention will become more apparent in light of the following detailed description of best mode embodiments thereof, as illustrated in the accompanying drawings.

BRIEF DESCRIPTION OF DRAWINGS

FIG. 1 is a schematic diagram for explaining the structure of a false call protecting apparatus for use with a telephone exchange system and a false call protecting method according to an embodiment of the present invention;

FIG. 2 is a schematic diagram showing an example of an operation sequence of an answer to a normal incoming call;

FIG. 3 is a schematic diagram showing an example of an operation sequence of the false call protecting apparatus against a false call shown in FIG. 1; and FIG. 4 is a schematic diagram for explaining the structure according to another embodiment of the present invention.

DESCRIPTION OF PREFERRED EMBODIMENTS

A false call protecting apparatus for use with a telephone exchange system and a false call protecting method according to an embodiment of the present invention will be described, with reference to the accompanying drawings.

FIG. 1 is a schematic diagram for explaining a false call protecting apparatus for use with a telephone exchange system according to an embodiment of the present invention.

Referring to FIG. 1, a time division switch 1 of an international exchange system has a supervising unit 5 that supervises a false signal mistaken as a signal CLF (clear forward) received from a false originating subscriber corresponding to the ITU-T No. 5 signal system. The false signal is sent with a false credit card number using a credit card call service of which an international call is made from a telephone set in other than the nation of which the credit card was issued to an terminating exchange station in the nation of which the credit card was issued and of which the communication fee is charged to the credit card number. An incoming trunk 2 accommodates domestic lines. An outgoing trunk 2 accommodates international lines. The signal unit 4 according to the standard No. 5 signal system is a unit that sends and receives an in-band line signal. The signal unit 4 is disposed between the time division switch 1 and the outgoing trunk 3.

The international telecommunication standard ITU-T No. 5 signal system is one of standard Nos. 1 to 7 and R1 and R2. This signal system is used for inter-continental submarine cables and satellite lines based on a signal system of a submarine cable laid between United States and England (TAT-1). In recent digital systems, signal units using signal digital processing technologies have been developed and implemented.

In addition, the No. 5 signal system is one kind of line oriented signal systems. In the No. 5 signal system, bidirectional communications and multi-staged repeating operations can be performed. In the No. 5 signal system, the signal supervising unit disposed for each line sends and receives a supervise signal and transfers a selection signal. The supervise signal has two in-band frequencies 2400 Hz and 2600 Hz. By combining these frequencies, sending order, and sending directions, up to 10 types of signals can be generated. The selection signal is of a multi-frequency system (2 out of 6) and has frequencies ranging from 700 Hz to 1700 Hz at intervals of 200 Hz. The selection signal is output as a register signal including a telephone number from a telephone set.

In the No. 5 signal system, the supervise signal is based on a compelled procedure of which an acknowledgment of a signal sent to the receiver is received therefrom. In addition, each acknowledgment signal has an acknowledgment time for acknowledging the signal. The acknowledgment time of acquisition/ready completion signals is around 40 ms. The acknowledgment time of other acknowledgment signals other than the acquisition/ready completion signals is around 125 ms.

Next, with reference to FIG. 2, a normal access procedure according to the No. 5 signal system will be described. When the user on the originating side hooks off a telephone set 10 and dials a toll-free number 800+XXX of a credit card call service (where XXX is a terminating telephone number) (at time T1), an originating international station 200 sends a seizing signal SZ (f1) as a supervise signal to a terminating international station 300 (at time T2). The terminating international station 300 sends back a signal PTS as an acknowledgment signal (f2) to the originating international station 200 (at time T3). The originating international station 200 sends a control signal including the number XXX as a register signal to the terminating international station 300 (at time T4). The terminating international station 300 calls a telephone set 40 on the terminating side corresponding to the telephone number of the credit card number. When the telephone set 40 on the terminating side answers the call, the terminating international station 300 transfers a signal ASS (f1) to the originating international station 200. The originating international station 200 transfers an acknowledgment signal ACK (f1) to the terminating international station 300. Thereafter, the user of the telephone set 10 on the originating side communicates with the user of the telephone set 40 on the terminating side. At this point, the terminating international station 300 starts charging the communication fee against the call. When the user on the originating side hooks on the telephone set 10, the originating international station 200 sends a signal CLF (f1+f2) that represents that the telephone set 10 on the originating side has been hooked on to the terminating international station 300. The terminating international station 300 sends a signal RLG (f1+f2) that represents the acknowledgment thereof to the originating international station 200, stops charging the communication fee against the call, and opens the communication path.

The false signal supervising unit 5 supervises a false CLF signal (f1+f2) shown in FIG. 3. In reality, the false CLF signal (f1+f2) has two frequencies 2,400 Hz and 2,600 Hz. The limit of the operation frequency f1 defined in the supervising unit 5 is 2,400 Hz$^{+100\ Hz}_{-150\ Hz}$. The limit of the operation frequency f2 is 2,600 Hz$^{+150\ Hz}_{-100\ Hz}$. Thus, the supervising unit 5 does not accept frequencies other than these limits. In addition, the limit of the signal level is in the range from −28 to −2 dBm0 (where dBm0 represents a digital value of 0 dBm that is an analog value). The difference of levels of two frequencies is 5 dB or less. The recognition tine is 100 ms or more. The false signal supervising unit 5 does not accept the false signal CLF that does not satisfy such conditions.

The false call protecting unit is provided corresponding to the number of lines of the No. 5 signal system, for example, the traffic amount of the 800 toll-free service in United States. In other words, it is not necessary to provide the apparatus for all international lines.

The signal unit 4 is composed of a signal receive unit 4A, a signal send unit 4B, and a system call processing software. When the supervising unit 5 detects a false signal, process signals sent to the system call processing software, and a connecting condition cause the call to be disconnected, Thus, when the telephone set 10 on the originating side sends a false signal CLF (f1+f2) to a terminating international station of a credit card call system service, if the frequencies of the signal do not satisfy the predetermined limit, a detecting portion 5A of the supervising unit 5 determines and detects that the received signal as a false signal. When the signal frequencies f1 and f2, the signal level difference thereof, the absolute values thereof, the signal levels thereof, the duration thereof, and so forth do not satisfy the defined values, the detecting portion 5A detects the signal CLF as a false signal. In this case, the signal unit 4 disconnects the call. Alternatively, after a communication is made between the originating side and the terminating side, the signal unit 4 disconnects the call. Thus, the user cannot make an international call with a false credit card number.

Next, the operation of the false call protecting apparatus according to the embodiment of the present invention will be described. The signal unit 4 according to the standard No. 5 signal system sends and receives a ling signal on the signal receive unit 4A and the signal send unit 4B under the control of the system call processing software. The line signal is Bent from the software processing portion 4B of the signal unit 4 according to the standard No. 5 signal system to the outgoing trunk 3. The line signal is received from the outgoing trunk 3 to the software processing portion 4A of the signal unit 4 according to the standard No. 5 signal system. For example, the line signal is sent to the time division switch 1. Thereafter, the line signal is sent to the telephone set 10 on the originating side through the incoming trunk 2. In this case, the telephone set 10 is a kind of an international communication terminal unit using a public telephone line. In addition, for example, the telephone set 10 has a credit card insertion hole.

Next, with reference to a sequence diagram shown in FIG. 3, the operation of the apparatus in the case that a false call takes place will be described.

At this point, the user of a telephone set 100 on a false originating side dials an 800 toll-free number (at time T1). Since the user uses the 800 toll-free number, an originating international station 100 connects the call to a terminating international station 300 free of charge. In other words, a seizing signal SZ (f1) is sent at time T2. An reply signal PTS (f1) is sent at time T3. A telephone number XXX of a telephone set 400 on the terminating side as a register signal and a control signal are sent at time T4. Thereafter, the telephone set 400 on the terminating side with the telephone number XXX is called and hooked off. An answer signal ANS (f1) to the register signal is sent. A signal ACK (f1) as a reply of the answer signal ANS (f1) is sent at time T5. By repeating sending and receiving signals corresponding to a predetermined procedure, the call is connected.

Next, a false originating user mends a false signal CLF (f1+f2) from a subscriber line (at time T6). In this case, it is assumed that the false signal CLP (f1+f2) passes through the originating international station 200. Since the terminating international station 300 receives the false signal CLF (f1+f2), the terminating international station 300 sends a release guard RLG (f1+f2) to the originating international station 200 (at time T7) and causes an outgoing trunk 3 and an incoming trunk 2 to be idle. When the signal unit 4 of the originating international station 200 can recognize the release guard RLG (f1+f2), it treats the signal as an illegal signal and disconnects the call as a false call. When the signal unit 4 cannot recognize the release guard RLG (f1+f2), it ignores the call.

The No. 5 signal system according to the embodiment employs a compelled procedure of acknowledgment transfer system. When a false originating user decreases the duration of the false signal CLF, the originating international station 200 cannot recognize the false signal CLP. In addition, the telephone set 100 on the false originating side decreases the duration of the release guard RLG so that the originating international station 200 cannot recognize it.

Thereafter, the telephone set 100 on the false originating side sends a false seizing signal SZ (f1) from the subscriber line (at time T8). Since the incoming trunk and the outgoing trunk of the terminating international station 300 are idle, it receives the seizing signal SZ (f1) and sends back a signal PTS (proceed to send) (f2) to the originating international station 200 (at time T9). When the originating international station 200 recognizes the signal PTS (f2) as a clear back signal CB (f2), it sends back an acknowledgment signal ACK (f1) to the terminating international station 300. When the originating international station 200 cannot recognize the signal PTS (f2), it ignores the signal.

A signal with the frequency f2 in the backward direction during communication is defined as a clear back signal CB. However, when the telephone set 100 on the false originating side decreases the duration of the seizing signal Sz, the originating international station 200 cannot recognize the signal PTS as the signal CB. When the terminating international station 200 receives the acknowledgment signal ACK (f1), it can receive an illegal signal and disconnect the call as a false call. When the terminating international station 200 does not receive the acknowledgment signal ACK (f1), if ignores the signal. Next, the telephone set 100 on the false originating side sends a false register signal from the subscriber line (at time T10). Although the terminating international station 300 sends back an answer signal ANS (f1) (at time T11), the originating international station 200 ignores the signal. A signal with the frequency f1 in the backward direction during communication has not been defined in the No. 5 signal system.

Next, a false acknowledgment signal ACK (f1) is sent back from the subscriber line on the false originating side (at time T12). Thus, a false communication can be made. In the case that the frequencies f1 and f2 are 2400 Hz and 2600 Hz, respectively, that a domestic incoming call is an 800 service request call, and that a line according to the No. 5 signal system is selected as an outgoing line, the exchange software causes the time division switch 1 to connect the false signal supervising unit 5 to a communication path from the domestic direction to the international direction on multiplex basis.

While the telephone set 100 on the false originating side is busy, when it sends a false CLF signal from the subscriber side, the detecting portion SA of the signal supervising unit 5 detects a false signal CLF received from the telephone set 100 on the false originating side. The call processing means of the signal processing unit 4 immediately disconnects the call.

Next, with reference to FIG. 4, another embodiment (second embodiment) of the present invention will be described. FIG. 4 shows the structure of the second embodiment of the present invention.

With reference to FIG. 4, the telephone exchange system has a false signal supervising unit 5 according to the No. 5 signal system. The false signal supervising unit 5 is disposed between a time division switch 1 and an outgoing trunk 3. An incoming trunk 2 accommodates domestic lines. The outgoing trunk 3 accommodates international lines. A signal unit 4 according to the No. 5 signal system sends and receives an in-band line signal. The signal unit 4 is disposed between the time division switch 1 and the outgoing trunk 3.

The false signal supervising unit 5 supervises frequencies f1+f2 (2.400 Hz+2,600 Hz). In the false signal supervising unit 5, the recognition time of the signal with the frequencies f1+f2 is minimized and the sensitivity and band thereof are maximized in the range that the ITU-T recommendation permits.

The difference between the first embodiment and the second embodiment is in that the false signal supervising unit 5 is disposed in the No. 5 signal unit 4. When the number of the false signal supervising units 5 is increased, the probability of which a false signal is overlooked remarkably decreases. Thus, a false call can be more perfectly protected. In other words, when a person tries to make a normal international call with a toll-free service, the supervising unit 5 does not detect a false signal. However, when the telephone set on the originating side sends a plurality of false signals shown in FIG. 3, even if the duration of the false signals is decreased, the probability of which the false signals are detected remarkably increases. Thus, false free calls can be protected.

According to the first and second embodiments, when false a call with a credit card number is made, the supervising means supervises the false call. When the supervising means detects a false signal, the disconnecting means immediately disconnects the call thereof. Thus, the performance of the telephone switch system can be improved. In addition, the security of the system can be improved.

In the above-described embodiments, telephone lines were considered. However, the present invention can be applied for data communications that have been widely used in recent years.

Even in mixed communications of sound, picture, and data as multimedia, since the above-described false signals can be detected, the present invention can be likewise applied.

Moreover, in the above-description, the international telecommunication standard No. 5 signal system was explained Furthermore, the present invention can be also applied for other communication standards with respective false signal supervising units corresponding to the characteristics thereof.

As described above, in the false call protecting apparatus for use with the telephone exchange system and the false call protecting method according to the present invention, since the originating station supervises false signals received from false subscribers, an international station that originates false calls protects false signals for itself. Thus, the performance of the telephone exchange system can be improved. In addition, the security of the system can be improved.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A false call protecting apparatus for use with a telephone exchange system operating according to at least one version of an International Telecommunication Union Telecommunication Standard ITU-T No. 5 Signal System that allows a call to be made with a credit card, said apparatus comprising:

supervising means for supervising a call to detect a false signal of a predetermined frequency corresponding to a credit card; and disconnecting means for disconnecting a call when said supervising means detects the false signal.

2. The false call protecting apparatus as set forth in claim 1, wherein said supervising means is disposed in time division switch means for periodically supervising the false signal.

3. The false call protecting apparatus as set forth in claim is 1, wherein the false signal is a combination signal of supervise signals f1 and f2 according to International Telecommunication Union telecommunication standard ITU-T recommendation No. 5 signal system.

4. A false call protecting apparatus for use with a telephone exchange system operating according to at least one version of an International Telecommunication Union Telecommunication Standard ITU-T No. 5 Signal System that allows a call to be made with a credit card, said apparatus comprising:

supervising means for supervising a call to detect a false signal corresponding to a credit card system;

detecting means for detecting the false signal of a pre-determined frequency corresponding to the credit card system received from an originating side; and disconnecting means for disconnecting a call when said detecting means detects the false signal.

5. The false call protecting apparatus as set forth in claim 4, wherein said supervising means is disposed in time division switch means for periodically supervising the false signal.

6. The false call protecting apparatus as set forth in claim 4, wherein the false signal is a combination signal of supervise signals f1 and f2 according to International Telecommunication Union telecommunication standard ITU-T recommendation No. 5 signal system.

7. The false call protecting apparatus as set forth in claim 5, wherein the false signal is a combination signal of supervise signals f1 and f2 according to International Telecommunication Union telecommunication standard ITU-T recommendation No. 5 signal system.

8. A false call protecting apparatus for use with a telephone exchange system operating according to at least one version of an International Telecommunication Union Telecommunication Standard ITU-T No. 5 Signal System that allows a call to be made with a credit card, said apparatus comprising:

supervising means for supervising a call to detect a false signal of a pre-determined frequency corresponding to a credit card system;

detecting means for detecting the false signal corresponding to the credit card system received from an originating side;

call processing means for detecting a false signal sent from a telephone set on a false originating side and performing a call process when said supervising means detects the false signal from a subscriber line while the telephone set on the false originating side is busy; and signal processing means for immediately disconnecting the call under the control of said call processing means.

9. The false call protecting method as set forth in claim 8, wherein the false signal is a combination signal of supervise signals f1 and f2 according to International Telecommunication Union telecommunication standard ITU-T recommendation No. 5 signal system.

10. A false call protecting method for use with a telephone exchange system operating according to at least one version of an International Telecommunication Union Telecommunication Standard ITU-T No. 5 Signal System that allows a call to be made with a credit card, said method comprising the steps of:

supervising a call for an appearance of a false signal of a predetermined frequency corresponding to the credit card system;

detecting the false signal corresponding to the credit card system received from an originating side;

performing a call processing step responsive to the false signal received from a false originating side when a telephone set on the false originating side sends the false signal while the false originating side is busy; and causing the call to be immediately disconnected at the call processing step.

11. The false cell protecting method as set forth in claim 10, wherein the false signal is a combination signal of supervise signals f1 and f2 according to International Telecommunication Union telecommunication standard ITU-T recommendation No. 5 signal system.

12. A communication exchange system operating according to at least one version of an International Telecommunication Union Telecommunication Standard ITU-T No. 5 Signal System that allows a call to be made with a toll-free service, said system comprising:

an originating side telephone for originating a call with a toll-free service telephone number;

an originating side exchange for receiving the call with the toll-free service telephone number;

a terminating side exchange station for sending and receiving a supervision signal corresponding to a compelled procedure with said originating side exchange station and for performing a charging process;

a terminating side telephone connected to said terminating side exchange station for communicating with said originating side telephone; and a supervising unit disposed between said originating side exchange station and said terminating side exchange station, for supervising and detecting a false signal of a predetermined frequency received from said originating side telephone;

wherein said originating side exchange station disconnects a communication path between said originating exchange side and said terminating side exchange station when said supervising unit detects the false signal.

* * * * *